(12) United States Patent
Cherkaoui et al.

(10) Patent No.: US 9,340,154 B2
(45) Date of Patent: May 17, 2016

(54) COLLISION AVOIDANCE IN VEHICULAR NETWORKS

(71) Applicant: SOCPRA Sciences et Génie s.e.c., Sherbrooke (CA)

(72) Inventors: Soumaya Cherkaoui, Sherbrooke (CA); Omar Chakroun, Sherbrooke (CA); Mohamed Amine Abid, Sherbrooke (CA)

(*) Notice: Subject to any disclaimer, the term of this patent is extended or adjusted under 35 U.S.C. 154(b) by 7 days.

(21) Appl. No.: 14/301,810

(22) Filed: Jun. 11, 2014

(65) Prior Publication Data

US 2015/0360611 A1 Dec. 17, 2015

(51) Int. Cl.
| | | |
|---|---|---|
| *B60Q 1/00* | (2006.01) | |
| *B60Q 9/00* | (2006.01) | |
| *G01S 13/93* | (2006.01) | |
| *B60Q 1/52* | (2006.01) | |
| *B60R 21/013* | (2006.01) | |

(52) U.S. Cl.
CPC ............... *B60Q 9/008* (2013.01); *B60Q 1/525* (2013.01); *B60R 21/013* (2013.01); *G01S 13/931* (2013.01)

(58) Field of Classification Search
CPC ...... B60Q 1/525; G01S 13/931; B60R 21/013
USPC .......................... 340/436, 902, 903; 700/301
See application file for complete search history.

(56) References Cited

U.S. PATENT DOCUMENTS

| | | | |
|---|---|---|---|
| 6,553,130 B1* | 4/2003 | Lemelson et al. | 340/436 |
| 7,095,336 B2* | 8/2006 | Rodgers et al. | 340/903 |
| 8,941,510 B2* | 1/2015 | Burnison et al. | 340/902 |
| 2013/0127638 A1* | 5/2013 | Harrison | 340/903 |

* cited by examiner

*Primary Examiner* — John A Tweel, Jr.
(74) *Attorney, Agent, or Firm* — Gowling WLG (Canada) LLP; Benoit Yelle

(57) ABSTRACT

A method and nodes for collision avoidance in a vehicular network comprising a plurality of vehicles and lower-speed users. Data from a plurality of position notification messages sent from the lower-speed-node is received (directly from the lower-speed-node or through a road-side-node) and processed, in a vehicle-on-board-node of a moving vehicle, with positioning data of the moving vehicle into collision avoidance instructions. The collision avoidance instructions may be provided inside the vehicle by displaying the instructions on a screen and/or broadcasting the instructions through a speaker in the vehicle. The collision avoidance instructions may also be automatically applied by modifying dynamic parameters of the vehicle (e.g., affecting the vehicle speed and/or changing direction of the vehicle). The position notification message may comprise a sequential number value; a temporary ID value; a geographic latitude value; a geographic longitude value; and a class-speed value.

32 Claims, 6 Drawing Sheets

| Field | Bytes |
|---|---|
| DSRCmsgID (2010) | 1 |
| MsgCount (2020) | 1 |
| TempID (2030) | 4 |
| DSecond (2040) | 2 |
| Latitude (2050) | 4 |
| Longitude (2060) | 4 |
| Elevation (2070) | 2 |
| Position Accuracy (2080) | 4 |
| Class Speed (2090) | 2 |
| Heading (2100) | 2 |
| Angle Acceleration (2110) | 2 |
| FCS (2120) | 4 |

2000

Figure 2

COLLISION AVOIDANCE IN VEHICULAR NETWORKS

TECHNICAL FIELD

The present invention relates to location determination for multiple objects and, more particularly, to location determination for multiple objects in a given area.

BACKGROUND

Road users' localization for safety purposes has received increasing attention in recent years. In many applications such as navigation-aid and parking assistance, user self-location information is used for maneuvering and facilitating navigation. Apart from self-contained systems offered by vehicle manufacturers, a growing research field is studying the generalization of all these services (e.g., through vehicular ad-hoc networks (VANETs)). Standards such as Dedicated Short Range Communication (DSRC) band and Wireless Access in Vehicular Environment (WAVE) aim at establishing a communication framework between vehicles (V2V), between vehicles and infrastructure (V2I) and even with other road infrastructure users such as pedestrians.

The present invention addresses the need for improved location data exchange between the various users of the road, e.g., vehicles, cyclists and/or pedestrians.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a method for collision avoidance in a vehicular network comprising a plurality of vehicles and lower-speed users of the vehicular network. The method comprises periodically receiving a position notification message, from a lower-speed-node, for use by a vehicle-on-board-node in a moving vehicle, receiving, in the vehicle-on-board-node, data from a plurality of position notification messages sent from the lower-speed-node and processing, in the vehicle-on-board-node, the data related to the plurality of position notification messages with positioning data of the moving vehicle into collision avoidance instructions.

Periodically receiving the position notification message may comprise periodically wirelessly receiving the position notification message, directly from the lower-speed-node, at the vehicle-on-board-node and processing the data related to the plurality of position notification messages may thus comprise processing the plurality of received position notification messages into the collision avoidance instructions.

Periodically receiving the position notification message may alternatively comprise periodically wirelessly receiving the position notification message, from the lower-speed-node, at a road side node and the method would thus further comprise, from the road side node, sending data from the plurality of position notification messages to the vehicle on board.

The method may also further comprise, from the vehicle-on-board-node, providing the collision avoidance instructions inside the vehicle. Providing the collision avoidance instructions inside the vehicle may comprise at least one of displaying the instructions on at least one screen in the vehicle and broadcasting the instructions through at least one sneaker in the vehicle.

The method may also optionally comprise, from the vehicle-on-board-node, applying the collision avoidance instructions by automatically modifying dynamic parameters of the vehicle. Modifying the dynamic parameters of the vehicle may comprise at least one of affecting the vehicle speed and changing direction of the vehicle.

The method may further comprise, in the vehicle-on-board-node, receiving data from a plurality of position notification messages sent from a second vehicle-on-board-node of a second moving vehicle. Processing, in the vehicle-on-board-node, the data related to the plurality of position notification messages would then further comprise processing the data related to the plurality of position notification messages sent from the lower-speed-node and the data plurality of position notification messages sent from the vehicle-on-board-node with positioning data of the moving vehicle into collision avoidance instructions. The second vehicle-on-board-node may also receive data from the plurality of position notification messages sent from the lower-speed-node and also receive data from a plurality of position notification messages sent from the vehicle-on-board-node of the moving vehicle. The method would then comprise, in the second vehicle-on-board-node, processing the data related to the plurality of position notification messages sent from the lower-speed-node and the data plurality of position notification messages sent from the vehicle-on-board-node with positioning data of the second moving vehicle into collision avoidance instructions for the second moving vehicle.

The position notification message may comprise a sequential number value; a temporary ID value; a geographic latitude value of the lower-speed-node; a geographic longitude value of the lower-speed-node; and a class-speed value. The class-speed value may indicate if the lower-speed-node is a pedestrian or a two-wheeler. The position notification message may also further comprise a message type value, a temporary ID value, a clock signal, an elevation value of the lower-speed-node and a position-accuracy value of the lower-speed-node. The temporary ID value may be a random value updated periodically, thereby enhancing privacy of the lower-speed-node. The position notification message may yet further comprise a compass heading value of the lower-speed-node and an angle-acceleration value of the lower-speed-node. The angle-acceleration value of the lower-speed-node may further convey a current position value of a steering wheel of two-wheeler, expressed as a positive angle of longitudinal and lateral acceleration.

A second aspect of the present invention is directed to a vehicle-on-board-node for collision avoidance for use in a moving vehicle in a vehicular network comprising a plurality of vehicles and lower-speed users of the vehicular network. The vehicle-on-board-node comprising a network interface module and a processing module. The network interface module is for periodically receiving data from a plurality of position notification messages sent from the lower-speed-node and the processor module is for processing the data related to the plurality of position notification messages with positioning data of the moving vehicle into collision avoidance instructions.

The network interface module may periodically receive the position notification message wirelessly directly from the lower-speed-node and the processor module may thus process the plurality of received position notification messages into the collision avoidance instructions.

Alternatively, the network interface module periodically may wirelessly receive the position notification message, originally sent from the lower-speed-node, from a road side node.

The vehicle-on-board-node may comprise at least one screen for displaying the collision avoidance instructions inside the vehicle and/or at least one speaker for broadcasting the collision avoidance instructions inside the vehicle.

The vehicle-on-board-node may optionally comprise a vehicle control module for applying the collision avoidance instructions by performing at least one of affecting the vehicle speed and changing direction of the vehicle.

The network interface module may optionally receive data from a plurality of position notification messages sent from a second vehicle-on-board-node of a second moving vehicle. The processor module would then, in that exemplary scenario, process the data related to the plurality of position notification messages by processing the data related to the plurality of position notification messages sent from the lower-speed-node and the data plurality of position notification messages sent from the vehicle-on-board-node with positioning data of the moving vehicle into collision avoidance instructions.

The position notification message may comprise a sequential number value; a temporary ID value; a geographic latitude value of the lower-speed-node; a geographic longitude value of the lower-speed-node; and a class-speed value. The class-speed value may indicate if the lower-speed-node is a pedestrian or a two-wheeler. The position notification message may also further comprise a message type value, a temporary ID value, a clock signal, an elevation value of the lower-speed-node and a position-accuracy value of the lower-speed-node. The temporary ID value may be a random value updated periodically, thereby enhancing privacy of the lower-speed-node. The position notification message may yet further comprise a compass heading value of the lower-speed-node and an angle-acceleration value of the lower-speed-node. The angle-acceleration value of the lower-speed-node may further convey a current position value of a steering wheel of two-wheeler, expressed as a positive angle of longitudinal and lateral acceleration.

A third aspect of the present invention is directed to a lower-speed-node for collision avoidance in a vehicular network comprising a plurality of vehicles and lower-speed users of the vehicular network. The lower-speed-node comprises a network interface for periodically sending a position notification message, for use by a vehicle-on-board-node in a moving vehicle and a processor module for processing at least location data of the lower-speed-node into the position notification message. The position notification message comprises a sequential number value; a temporary ID value; a geographic latitude value of the lower-speed-node; a geographic longitude value of the lower-speed-node; and a class-speed value.

The processor module may set the temporary ID value to a random value and may also update the random periodically, thereby enhancing privacy.

The processor module may also increment the sequential number value at each periodic transmission of the position notification message.

The class-speed value may indicate if the lower-speed-node is a pedestrian or a two-wheeler.

The position notification message may further comprise a message type value; a temporary ID value; a clock signal; an elevation value of the lower-speed-node; and a position-accuracy value of the lower-speed-node. The position notification message may yet further comprise a compass heading value of the lower-speed-node; and an angle-acceleration value of the lower-speed-node. The processor module may set the class-speed value to a two-wheeler and further set the angle-acceleration value considering a current position value of a steering wheel of the two-wheeler, expressed as a positive angle of longitudinal and lateral acceleration.

BRIEF DESCRIPTION OF THE DRAWINGS

Further features and exemplary advantages of the present invention will become apparent from the following detailed description, taken in conjunction with the appended drawings, in which:

FIG. 2 is a logical representation of an exemplary frame format in accordance with the teachings of the present invention;

DETAILED DESCRIPTION

Figure 1:
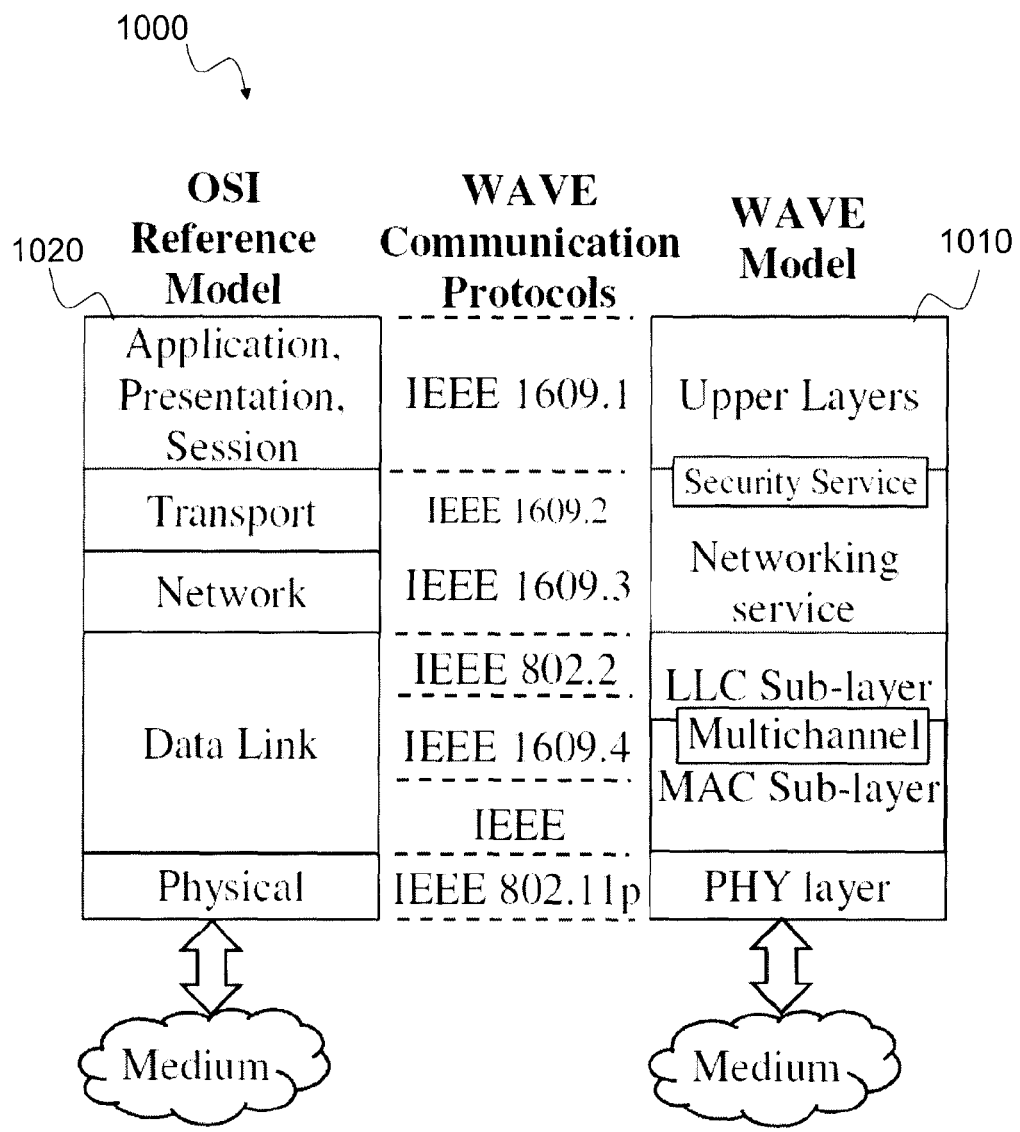
FIG. 1 is a logical representation of an exemplary network stack in accordance with the teachings of the present invention.

The present invention generally aimed at improving and/or developing vehicular safety based on location data exchange between nodes at various speeds. Such application can possibly leverage different wireless technologies to eventually converge on vehicular networks to deliver information to vehicles in a timely manner (e.g., in conformity with the Wireless Access in Vehicular Environment (WAVE) and/or Dedicated Short Range Communication (DSRC) band standards). Pedestrians and two-wheelers may be defined as mobile or stationary nodes road side units. However, in the context of the present invention, the definition of pedestrians and two-wheelers is extended to include scenarios in which the road is shared with vehicles. In such a context, a collision avoidance application seeks to deliver pedestrians and/or two-wheelers location to vehicles that may engage a shared intersection (e.g., using a protocol compatible with WAVE/DSRC). Different modes of operation may be used depending on the expected context, as will be shown further below with particular reference to exemplary embodiments of the present invention.

In one exemplary embodiment, the DSRC frequency spectrum and channel allocation is used. The DSRC represents a dedicated 75 MHz of bandwidth in the 5.9 GHz frequency band made available for communications, for instance, with WAVE, for public safety and private services. DSRC is meant to provide high data transfer rates for vehicles in a communication zone under 1 kilometer (0.6 miles) with a latency in the range of 100 ms. The DSRC frequency spectrum may be partitioned into multiple channels. In the context of the present example, it is assumed that seven 10 MHz channels including a control channel (CCH) and six service channels (SCH) are provided. The CCH (also referred to as CH178) is centered on 5.89 GHz and is meant to be used only for public safety and control purposes. No private services are allowed on the CCH. The maximum transmit power is 44.8 dBm. The six SCH service channels are CH172 centered on 5.86 GHz, CH174 centered on 5.87 GHz, CH176 centered on 5.88 GHz, CH180 centered on 5.90 GHz, CH182 centered on 5.91 GHz, and CH184 centered on 5.92 GHz. Channels CH174, CH176, CH180, and CH182 are used for public safety and private services and allow a maximum transmit power of 33 dBm (CN 174 and CH 176) and 23 dBm (CH 180, CH182). Channels CH172 and CH184 are allocated, respectively for V2V public safety channel (maximum transmit power of 33 dBm) and intersection public safety channel (40 dBm). Skilled persons will readily recognize that other channel partitioning schemes as well as other frequency spectrums can be used in the context of the present invention and that the embodiment illustrated in the context of WAVE/DSRC is one of many contexts that may be adapted to support the present invention.

WAVE is one exemplary communication standard between nodes in vehicular networks used to illustrate the present invention. In the context of the present invention, an Onboard Unit (OBU) is defined as a device located in vehicles or handled by pedestrians and two-wheelers. A Roadside Unit (RSU) is defined as a device located on the road and acting as a service provider.

Reference is now made to the drawings in which FIG. 1 shows an exemplary logical representation of a layered architecture 1000 in accordance with the teachings of the present invention. As illustrated in FIG. 1, WAVE may be used in an operation mode set in accordance with IEEE 802.11p in the DSRC band. An example of a WAVE model 1010 may be presented as a layered architecture compatible with the Open Systems Interconnection (OSI) stack 1020.

IEEE 802.11p represents a standard for Physical and Medium Access Control (MAC) layers of WAVE. It is meant to support communication between high mobility nodes with speeds up to 280 Km/h (170 MPH). Changes compared to IEEE 802.11a include: a) signal bandwidth reduced to 10 MHz, b) removal of scanning and association procedure allowing connection setup and data transfer in only 100 ms. IEEE1609.4 represents the mechanisms of multi-channels operation for switching between control and service channels. IEEE1609.3 defines addressing and data delivery services to higher layer entities. IEEE 1609.2 covers the format of secure messages and their processing. IEEE1609.1 allows the interaction between an Onboard Unit (OBU) and in-vehicle application(s). IEEE802.11p and IEEE 1609.4 are based on IEEE 802.11a with some adaptations. For instance, the multi-channels operation aims to facilitate the recurrent switching coordination between channels for WAVE-compatible units. These compatible units can exchange information either independently over the CCH or by forming a WAVE Basic Service Set (WBSS) and exchange information through one SCH. A WBSS consists on time and frequency allocation, and is announced in CCH. Two types of WBSS are supported in WAVE; 1) persistent WBSS announced in each CCH interval, and 2) non-persistent WBSS announced only on creation. If an application uses WBSS, WAVE units can communicate using two protocol stacks; 1) WAVE Short Message Protocol (WSMP), which is a WAVE protocol defined to reduce latency and overhead and so be effective for time sensitive applications. 2) IPv6 protocol. Note that only WSMP can be used for applications that do not support WBSS.

FIG. 2 shows a logical representation of an exemplary lower-speed-node position data frame format 2000 in accordance with the present invention. The lower-speed-node position data frame format 2000 is meant to be compatible with frame formats that comply with NMAE2000 in order for GPS systems locating and mapping systems that already comply with NMAE2000 to be adaptable to the exemplary embodiment that uses the lower-speed-node position data frame format 2000. Skilled persons will readily understand that other frame formats (not shown) could be used without affecting the present invention. The exemplary lower-speed-node position data frame format 2000 may be used to convey information on a pedestrian or a two-wheeler or any other node that moves at a speed not expected from other typical vehicles on the road. The exemplary lower-speed-node position data frame format 2000 is composed of 12 fields presented in their order of appearance as illustrated in FIG. 2.

2010. DSRCmsgID: determines a type of the message in which the frame appears.

2020. MsgCount: provides a sequential number incremented at each successive transmission by a given node. It may be used in packet error statistics.

2030. TempID: provides a temporary ID, that may be set to a random constant for a period of time, and may further be changed occasionally or periodically, e.g., for privacy reasons.

2040. DSecond: provides a clock signal for messages time stamping.

2050. Latitude: provides a geographic latitude value of node.

2060. Longitude: provides a geographic longitude value of node.

2070. Elevation: provides an elevation value, e.g., compared to the sea level.

2080. Position-Accuracy: may be used to convey a measure of precision value for the latitude and longitude values, e.g., to evaluate the location information accuracy.

2090. Class-Speed: may be used to convey a value determining if it is, e.g., a pedestrian or a two-wheeler.

2100. Heading: provides a compass heading value of node.

2110. Angle-Acceleration: may be used to convey a current position value of a steering wheel of two-wheeler, expressed as a positive angle of longitudinal and lateral acceleration.

2120. Checksum: may be used to convey checksum parity value for error detection.

A frame compatible with the lower-speed-node position data frame format 2000 may be further encapsulated in an IEEE802.11p frame inducing an overhead of 32 bytes. Skilled persons will recognize that the present invention may be implemented by using only a subset of the 12 fields from the exemplary data frame format 2000.

Figure 3A:
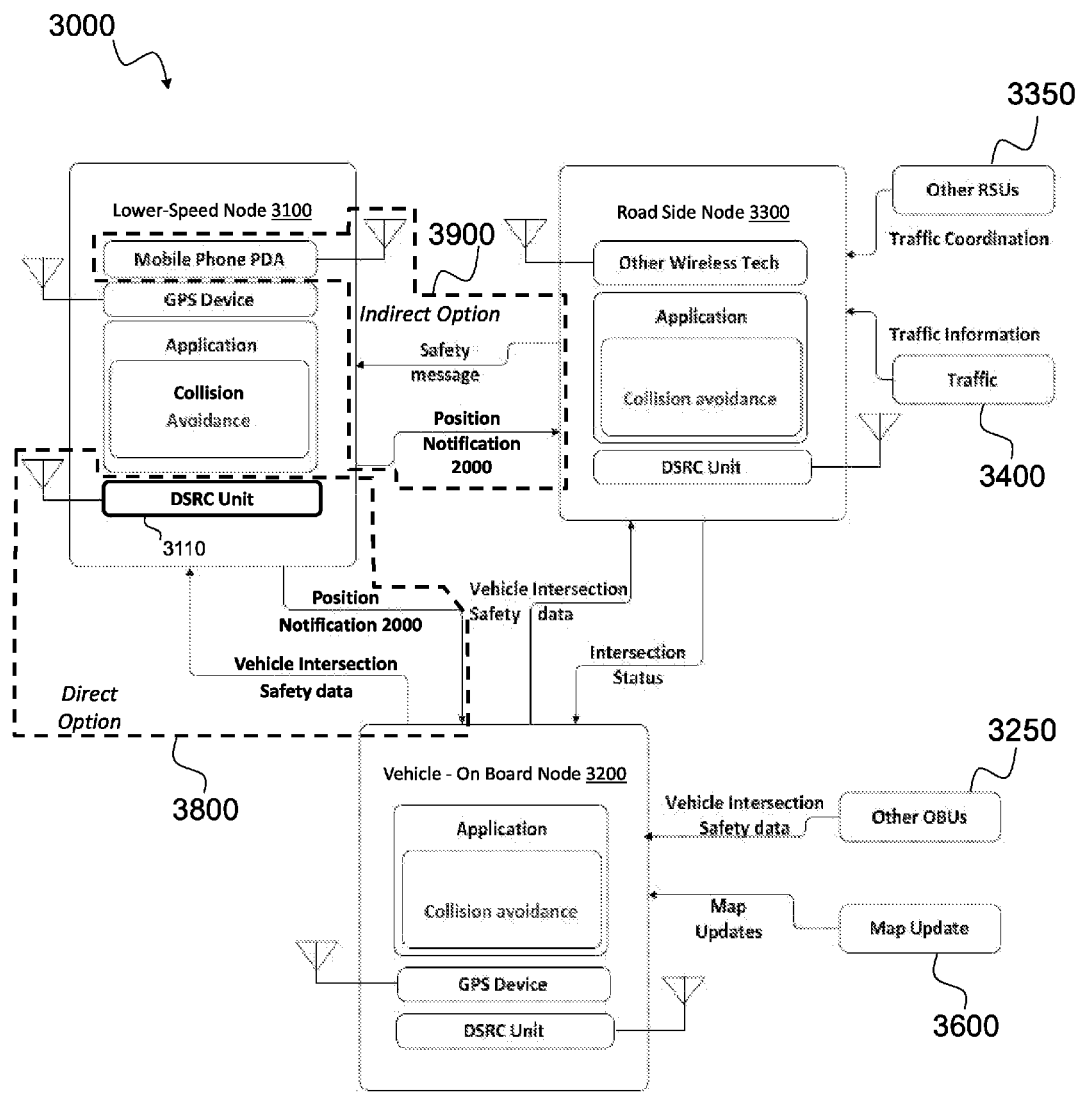
FIG. 3A, FIG. 3B and FIG. 3C, herein referred to concurrently as FIG. 3, are modular diagrams of an exemplary system in accordance with the teachings of the present invention.
Figure 3B:
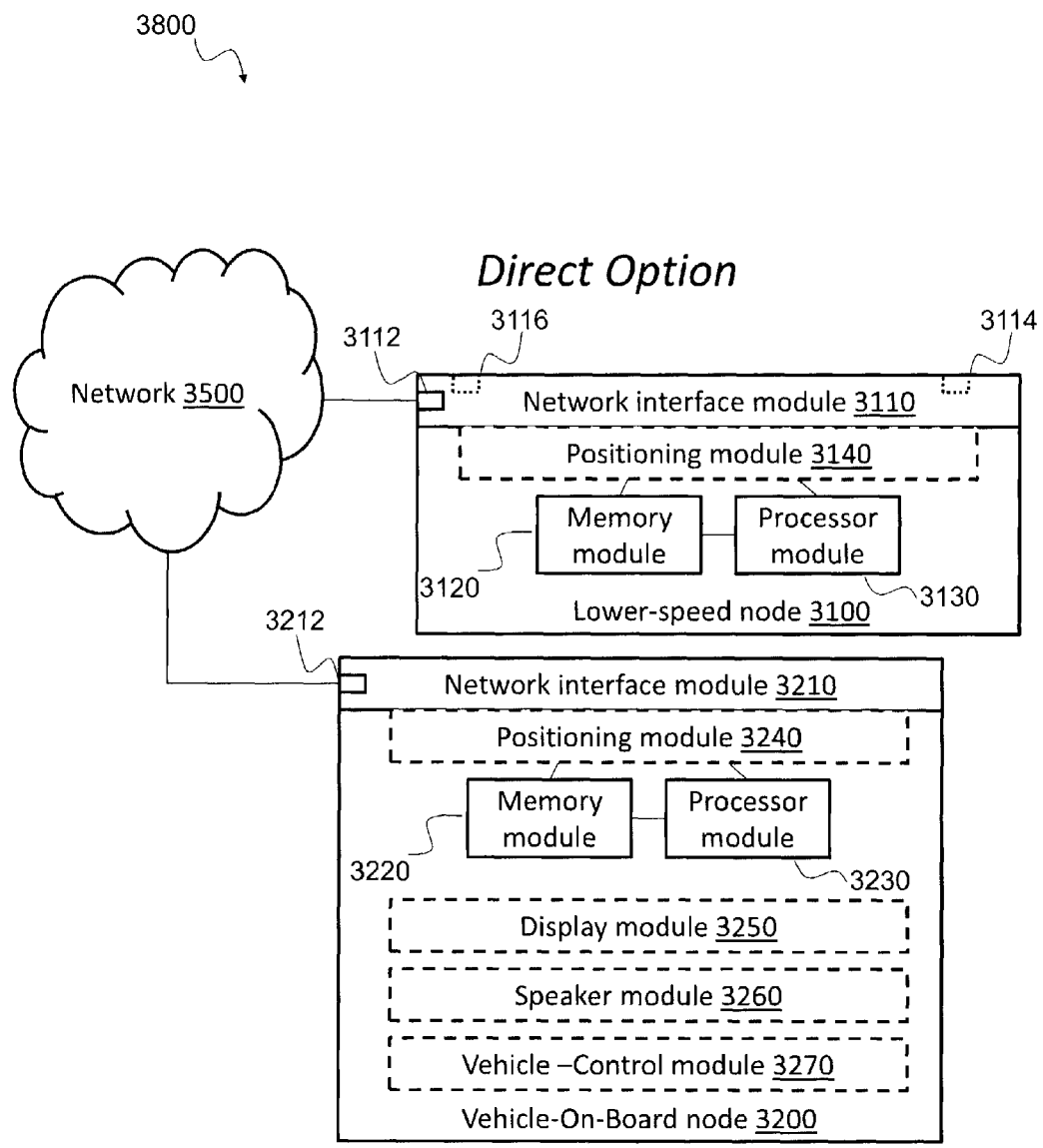
Figure 3C:
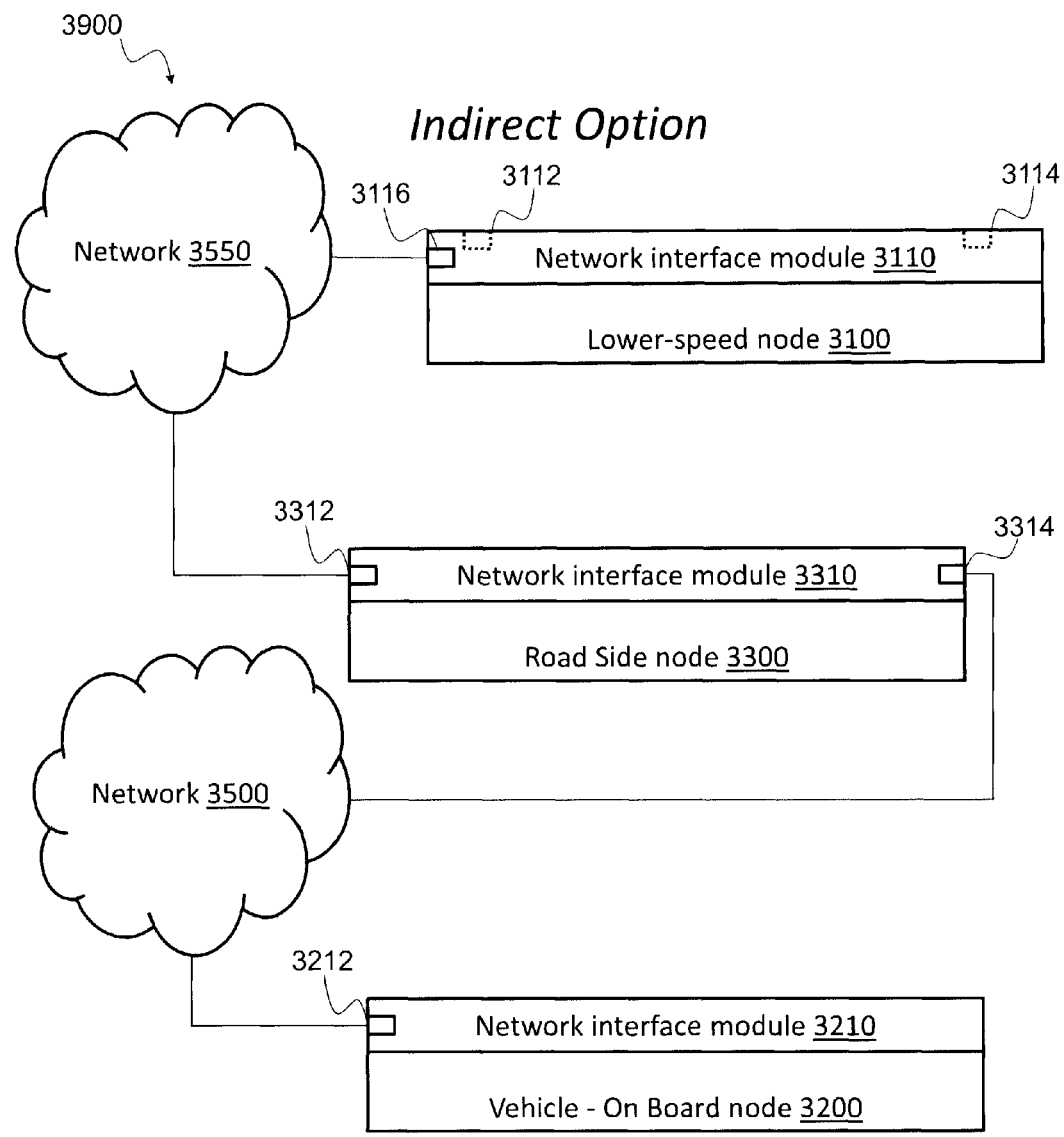

FIGS. 3A, 3B and 3C, together referred to as FIG. 3, show modular representations of an exemplary collision avoidance system 3000 in accordance with the teachings of the present invention. The system 3000 comprises a lower-speed-node (e.g., pedestrian or two-wheeler) 3100, a road side node 3300, 3350 and one or more vehicle-on board nodes 3200, 3250. Skilled persons will readily recognize that more nodes 3100, 3200, 3300, 3250, 3350 could be present in the system. A traffic data provider 3400 and a map update provider 3600 are also depicted in the example of FIG. 3.

Two major options 3800 and 3900 are considered. The first one 3800 illustrates a direct option (e.g., pedestrian to vehicle (P2V) or two-wheeler to vehicle (T2V)) where the lower-speed-node 3100 is equipped with a DSRC Unit 3110 (e.g., an ultra-small DSRC Unit). The second one 3900 illustrates an indirect option (e.g., pedestrian to infrastructure (P2I) or two-wheeler to infrastructure (T2I)+Infrastructure to Vehicle (I2V)) where the lower-speed-node 3100 uses another wireless technology (e.g., Wi-Fi or data cellular network) to exchange data with the road side node 3300, which in turn will be acting as an intermediary with vehicle-on board nodes 3200 and/or 3250.

The direct option 3800 is an adaptation of a vehicle to vehicle (V2V) scenario that allows the low velocity of the lower-speed-node 3100 to be taken into account. The indirect option 3900 is equivalent to dividing the problem in two parts: 1) P2I or T2I, and 2) I2V.

The exemplary vehicle-on-board-node 3200 comprises a network interface module 3210 and a processing module 3230. The network interface module 3210 comprises one or more network interfaces 3212 to connect the vehicle-on-board-node 3200 to a communications network 3500. The network interface module 3210 periodically receives data from a plurality of position notification messages sent from the lower-speed-node 3100 and the processor module 3230 processes the data related to the plurality of position notification messages with positioning data of the moving vehicle into collision avoidance instructions. The positioning data of the moving vehicle may come from a positioning module 3240 of the vehicle-on-board-node 3200, but may also be provided to the vehicle-on-board-node 3200 from an external module (e.g., a smart phone or other an external GPS receiver, via a short-range communication link (e.g., Bluetooth) or a wired connection).

The network interface module 3210 may periodically receive the position notification message wirelessly directly from the lower-speed-node 3100 and the processor module 3230 may thus process the plurality of received position notification messages into the collision avoidance instructions. Alternatively, the network interface module 3210 may periodically wirelessly receive the position notification message, originally sent from the lower-speed-node 3100, from a road side node 3300.

The vehicle-on-board-node 3200 may comprise a display module 3250 for managing at least one screen for displaying the collision avoidance instructions inside the vehicle and/or a speaker module 3260 for managing at least one speaker for broadcasting the collision avoidance instructions inside the vehicle. The screen and the speaker may be integrated into the vehicle-on-board-node 3200 or could be wired or wireless external devices (not shown).

The vehicle-on-board-node 3200 may optionally comprise a vehicle control module 3270 for applying the collision avoidance instructions by performing at least one of affecting the vehicle speed (e.g., applying the vehicle breaks or accelerating) and changing direction of the vehicle. The vehicle control module 3270 may be performed directly by the vehicle-on-board-node 3200, but may also be sent to an external control system (not shown) of the vehicle (e.g., a control system (provided by the vehicle manufacturer or a third party), accessible in the vehicle, for instance, through a standardized interface).

The exemplary lower-speed-node 3100 comprises a network interface 3110 for periodically sending a position notification message, for use by a vehicle-on-board-node 3200 and a processor module 3130 for processing at least location data of the lower-speed-node into the position notification message. The position notification message comprises a sequential number value; a temporary ID value; a geographic latitude value of the lower-speed-node; a geographic longitude value of the lower-speed-node; and a class-speed value. The data set in the position notification message may be provided, at least partially, from a positioning module 3140 of the lower-speed-node 3100 or may also be provided to the lower-speed-node 3100 from an external module (e.g., a smart phone or other an external GPS receiver, via a short-range communication link (e.g., Bluetooth) or a wired connection).

The network interface module 3110 comprises one or more network interfaces 3112, 3114, 3116 to connect towards the vehicle-on-board-node 3200 via the communications network 3500 and/or to connect towards the road-side node 3300 via a communications network 3550.

The processor module 3130 may set the temporary ID value to a random value and may also update the random periodically, thereby enhancing privacy of the lower-speed-node 3100 since it would be more difficult to eventual interceptors of the position notification messages to track the lower-speed-node 3100. The processor module 3130 may also increment the sequential number value at each periodic transmission of the position notification message. The class-speed value may indicate if the lower-speed-node is a pedestrian or a two-wheeler.

Figure 4:
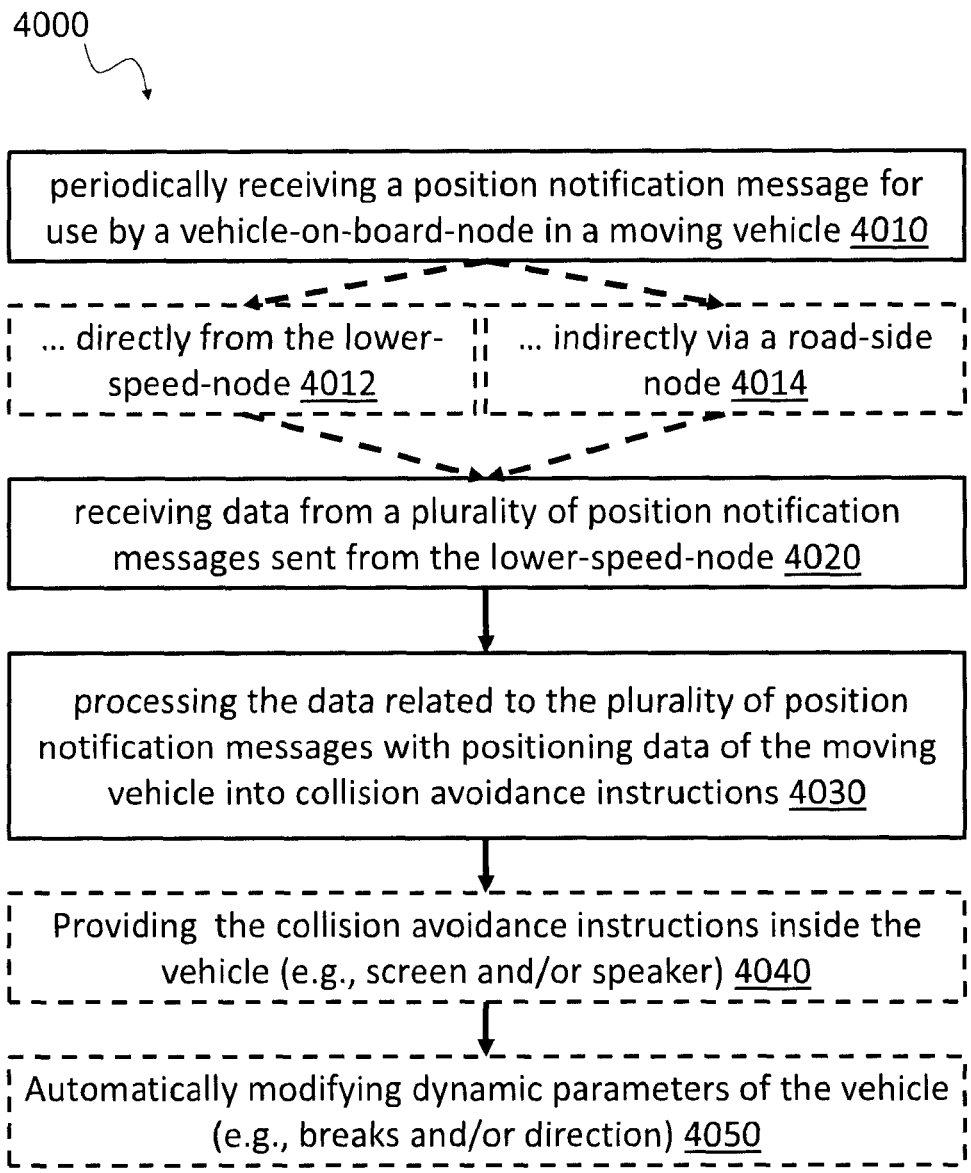
FIG. 4 is a flow chart of an exemplary method in accordance with the teachings of the present invention.

FIG. 4 shows a flow chart of an exemplary method 4000 in accordance with the teachings of the present invention. The method 4000 aims at collision avoidance in a vehicular network comprising a plurality of vehicles and lower-speed users of the vehicular network. The method comprises periodically receiving 4010 a position notification message, from a lower-speed-node, for use by a vehicle-on-board-node in a moving vehicle. The method also comprises receiving 4020, in the vehicle-on-board-node, data from a plurality of position notification messages sent from the lower-speed-node and processing 4030, in the vehicle-on-board-node, the data related to the plurality of position notification messages with positioning data of the moving vehicle into collision avoidance instructions.

Periodically receiving the position notification message 4010 may comprise periodically wirelessly receiving the position notification message, directly from the lower-speed-node 4012, at the vehicle-on-board-node and processing the data related to the plurality of position notification messages may thus comprise processing the plurality of received position notification messages into the collision avoidance instructions.

Alternatively, periodically receiving the position notification message 4010 may alternatively comprise periodically wirelessly receiving the position notification message 4014, from the lower-speed-node, at a road side node and the method would thus further comprise, from the road side node, sending data from the plurality of position notification messages to the vehicle on board.

The method may also further comprise, from the vehicle-on-board-node, providing the collision avoidance instructions inside the vehicle 4040. Providing the collision avoidance instructions inside the vehicle may comprise at least one of displaying the instructions on at least one screen in the vehicle and broadcasting the instructions through at least one speaker in the vehicle. The vehicle-on-board-node may also provide the collision avoidance instructions, in addition or alternatively, outside the vehicle 4040 (not shown; e.g., visual signal (lights) and/or sound signal (horn or speaker), etc.).

The method may also optionally comprise, from the vehicle-on-board-node, applying the collision avoidance instructions by automatically modifying dynamic parameters of the vehicle 4050. Modifying the dynamic parameters of the vehicle may comprise at least one of affecting the vehicle speed (e.g., applying the vehicle breaks or accelerating) and changing direction of the vehicle. The vehicle-on-board-node may also send or otherwise broadcast the automatic modification of the dynamic parameters of the vehicle (not shown). This may allow other nodes of the vehicular network to automatically or manually react to the modified parameters of the vehicle.

The position notification message may comprise a sequential number value; a temporary ID value; a geographic latitude value of the lower-speed-node; a geographic longitude value of the lower-speed-node; and a class-speed value. The class-speed value may indicate if the lower-speed-node is a pedestrian or a two-wheeler. The position notification message may also further comprise a message type value, a temporary ID value, a clock signal, an elevation value of the lower-speed-node and a position-accuracy value of the lower-speed-node. The temporary ID value may be a random value updated periodically, thereby enhancing privacy of the lower-speed-node. The position notification message may yet further comprise a compass heading value of the lower-speed-node and an angle-acceleration value of the lower-speed-node. The angle-acceleration value of the lower-speed-node may further convey a current position value of a steering wheel of two-wheeler, expressed as a positive angle of longitudinal and lateral acceleration. The angle-acceleration value of the lower-speed-node may further convey a current position value of a steering wheel of two-wheeler, expressed as a positive angle of longitudinal and lateral acceleration.

When processing the data 4030 related to the plurality of position notification messages with positioning data of the moving vehicle, the positioning data of the moving vehicle may comprise a geographic latitude value, a geographic longitude value, an elevation value, a position-accuracy value, a compass heading value and an angle-acceleration value. All these values, in addition to the data from the position notification messages, may thus be processed in 4030. For instance, the purpose of the processing may be to determine a probability of collision between the vehicle and the lower-speed node while. The probability of collision may then be assigned a numerical value which is used for deciding if and when to provide the collision avoidance instructions inside the vehicle and, more specifically, to decide if and when to apply the collision avoidance instructions by automatically modifying dynamic parameters of the vehicle.

In some embodiments, the vehicle-on-board-node also receives additional positioning data from other vehicle-on-board-nodes and/or other lower-speed nodes comprised in the vehicular network. The additional positioning data may further be processed in 4030 to avoid collisions with the corresponding nodes. In addition, other vehicle-on-board-nodes may also apply a decision process that is equivalent to the vehicle-on-board-node 3200. For instance, a vehicle-on-board-node (not shown) in a second vehicle (not shown) may anticipate the automatic modifications to the dynamic parameters of the vehicle-on-board-node' 3200 vehicle and further proceed with automatically modifying dynamic parameters of the second vehicle to avoid the vehicle-on-board-node' 3200 vehicle and all lower-speed nodes. This chained reaction may also be replicated by a plurality of the vehicle-on-board-nodes in the vehicular network.

More specifically, in some embodiments, the method may further comprise, in the vehicle-on-board-node, receiving data from a plurality of position notification messages sent from a second vehicle-on-board-node of a second moving vehicle. Processing, in the vehicle-on-board-node, the data related to the plurality of position notification messages would then further comprise processing the data related to the plurality of position notification messages sent from the lower-speed-node and the data plurality of position notification messages sent from the vehicle-on-board-node with positioning data of the moving vehicle into collision avoidance instructions. The second vehicle-on-board-node may also receive data from the plurality of position notification messages sent from the lower-speed-node and also receive data from a plurality of position notification messages sent from the vehicle-on-board-node of the moving vehicle. The method would then comprise, in the second vehicle-on-board-node, processing the data related to the plurality of position notification messages sent from the lower-speed-node and the data plurality of position notification messages sent from the vehicle-on-board-node with positioning data of the second moving vehicle into collision avoidance instructions for the second moving vehicle.

The processor modules 3130, 3230 may represent a single processor with one or more processor cores or an array of processors, each comprising one or more processor cores. The memory module 3120, 3220 may comprise various types of memory (different standardized or kinds of Random Access Memory (RAM) modules, memory cards, Read-Only Memory (ROM) modules, programmable ROM, etc.). The storage devices module may represent one or more logical or physical as well as local or remote hard disk drive (HDD) (or an array thereof). The storage devices module (not shown) may further represent a local or remote database made accessible to the node by a standardized or proprietary interface. The network interface module 3110, 3210, 3310 represents at least one physical interface that can be used to communicate with other network nodes. The network interface module 3110, 3210, 3310 may be made visible to the other modules of the node through one or more logical interfaces. The actual stacks of protocols used by the physical network interface(s) and/or logical network interface(s) of the network interface module 3110, 3210, 3310 do not affect the teachings of the present invention. The variants of processor module 3130, 3230, memory module 3120, 3220, network interface module 3110, 3210, 3310 and storage devices module usable in the context of the present invention will be readily apparent to persons skilled in the art. Likewise, even though explicit mentions of the memory module 3120, 3220 and/or the processor module 3130, 3230 are not made throughout the description of the present examples, persons skilled in the art will readily recognize that such modules are used in conjunction with other modules of the node to perform routine as well as innovative steps related to the present invention.

Various network links may be implicitly or explicitly used in the context of the present invention, especially for map updates and traffic information. In some embodiment, a wired or wireless access point (not shown) may be present on the link between different nodes. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for collision avoidance in a vehicular network comprising a plurality of vehicles and lower-speed users of the vehicular network, the method comprising:
   periodically receiving a position notification message, from a lower-speed-node, for use by a vehicle-on-board-node in a moving vehicle;
   in the vehicle-on-board-node, receiving data from a plurality of position notification messages sent from the lower-speed-node; and
   in the vehicle-on-board-node, processing the data related to the plurality of position notification messages with positioning data of the moving vehicle into collision avoidance instructions;
   wherein the position notification message comprises:
      a sequential number value;
      a temporary ID value;
      a geographic latitude value of the lower-speed-node;
      a geographic longitude value of the lower-speed-node; and
      a class-speed value.

2. The method of claim 1, wherein periodically receiving the position notification message comprises periodically wirelessly receiving the position notification message, directly from the lower-speed-node, at the vehicle-on-board-node and wherein processing the data related to the plurality of position notification messages comprises processing the plurality of received position notification messages into the collision avoidance instructions.

3. The method of claim 1, wherein periodically receiving the position notification message comprises periodically wirelessly receiving the position notification message, from the lower-speed-node, at a road side node, the method further comprising, from the road side node, sending data from the plurality of position notification messages to the vehicle on board.

4. The method of claim 1 further comprising, from the vehicle-on-board-node, providing the collision avoidance instructions inside the vehicle.

5. The method of claim 4, wherein providing the collision avoidance instructions inside the vehicle comprise at least one of displaying the instructions on at least one screen in the vehicle and broadcasting the instructions through at least one speaker in the vehicle.

6. The method of claim 1 further comprising, from the vehicle-on-board-node, applying the collision avoidance instructions by automatically modifying dynamic parameters of the vehicle.

7. The method of claim 6, wherein modifying the dynamic parameters of the vehicle comprise at least one of affecting the vehicle speed and changing direction of the vehicle.

8. The method of claim 1, wherein the class-speed value indicates if the lower-speed-node is a pedestrian or a two-wheeler.

9. The method of claim 1, wherein the position notification message further comprises:
   a message type value;
   a clock signal;
   an elevation value of the lower-speed-node; and
   a position-accuracy value of the lower-speed-node.

10. The method of claim 1, wherein the temporary ID value is a random value updated periodically, thereby enhancing privacy of the lower-speed-node.

11. The method of claim 1, wherein the position notification message further comprises:
    a compass heading value of the lower-speed-node; and
    an angle-acceleration value of the lower-speed-node.

12. The method of claim 11, wherein the angle-acceleration value of the lower-speed-node conveys a current position value of a steering wheel of two-wheeler, expressed as a positive angle of longitudinal and lateral acceleration.

13. The method of claim 1 further comprising
    in the vehicle-on-board-node, receiving data from a plurality of position notification messages sent from a second vehicle-on-board-node of a second moving vehicle; and
    wherein processing, in the vehicle-on-board-node, the data related to the plurality of position notification messages further comprises processing the data related to the plurality of position notification messages sent from the lower-speed-node and the data plurality of position notification messages sent from the vehicle-on-board-node with positioning data of the moving vehicle into collision avoidance instructions.

14. The method of claim 13 further comprising:
    in the second vehicle-on-board-node, receiving data from the plurality of position notification messages sent from the lower-speed-node;
    in the second vehicle-on-board-node, receiving data from a plurality of position notification messages sent from the vehicle-on-board-node of the moving vehicle; and
    in the second vehicle-on-board-node, processing the data related to the plurality of position notification messages sent from the lower-speed-node and the data plurality of position notification messages sent from the vehicle-on-board-node with positioning data of the second moving vehicle into collision avoidance instructions for the second moving vehicle.

15. A vehicle-on-board-node for collision avoidance for use in a moving vehicle in a vehicular network comprising a plurality of vehicles and lower-speed users of the vehicular network, the vehicle-on-board-node comprising:
    a network interface module for periodically receiving data from a plurality of position notification messages sent from a lower-speed-node; and
    a processor module for processing the data related to the plurality of position notification messages with positioning data of the moving vehicle into collision avoidance instructions;
    wherein the position notification message comprises:
       a sequential number value;
       a temporary ID value;
       a geographic latitude value of the lower-speed-node;
       a geographic longitude value of the lower-speed-node; and
       a class-speed value.

16. The vehicle-on-board-node of claim 15, wherein the network interface module periodically receives the position notification message wirelessly directly from the lower-speed-node and wherein the processor module processes the plurality of received position notification messages into the collision avoidance instructions.

17. The vehicle-on-board-node of claim 15, wherein the network interface module periodically receives wirelessly receives the position notification message, originally sent from the lower-speed-node, from a road side node.

18. The vehicle-on-board-node of claim 15 further comprising at least one screen for displaying the collision avoidance instructions inside the vehicle.

19. The vehicle-on-board-node of claim 15 further comprising at least one speaker for broadcasting the collision avoidance instructions inside the vehicle.

20. The vehicle-on-board-node of claim 15 further comprising a vehicle control module for applying the collision avoidance instructions by performing at least one of affecting the vehicle speed and changing direction of the vehicle.

21. The vehicle-on-board-node of claim 15, wherein the class-speed value indicates if the lower-speed-node is a pedestrian or a two-wheeler.

22. The vehicle-on-board-node of claim 15, wherein the position notification message further comprises:
- a message type value;
- a clock signal;
- an elevation value of the lower-speed-node; and
- a position-accuracy value of the lower-speed-node.

23. The vehicle-on-board-node of claim 15, wherein the position notification message further comprises:
- a compass heading value of the lower-speed-node; and
- an angle-acceleration value of the lower-speed-node.

24. The vehicle-on-board-node of claim 23, wherein the angle-acceleration value of the lower-speed-node conveys a current position value of a steering wheel of two-wheeler, expressed as a positive angle of longitudinal and lateral acceleration.

25. The vehicle-on-board-node of claim 15, wherein the network interface module receive data from a plurality of position notification messages sent from a second vehicle-on-board-node of a second moving vehicle, wherein the processor module processes the data related to the plurality of position notification messages by processing the data related to the plurality of position notification messages sent from the lower-speed-node and the data plurality of position notification messages sent from the vehicle-on-board-node with positioning data of the moving vehicle into collision avoidance instructions.

26. A lower-speed-node for collision avoidance in a vehicular network comprising a plurality of vehicles and lower-speed users of the vehicular network, the lower-speed-node comprising:
- a network interface for periodically sending a position notification message, for use by a vehicle-on-board-node in a moving vehicle;
- a processor module for processing at least location data of the lower-speed-node into the position notification message comprising:
  - a sequential number value;
  - a temporary ID value;
  - a geographic latitude value of the lower-speed-node;
  - a geographic longitude value of the lower-speed-node; and
  - a class-speed value.

27. The lower-speed-node of claim 26, wherein the processor module sets the temporary ID value to a random value and for updating the random periodically, thereby enhancing privacy.

28. The lower-speed-node of claim 26, wherein the processor module increments the sequential number value at each periodic transmission of the position notification message.

29. The lower-speed-node of claim 26, wherein the class-speed value indicates if the lower-speed-node is a pedestrian or a two-wheeler.

30. The lower-speed-node of claim 26, wherein the position notification message further comprises:
- a message type value;
- a clock signal;
- an elevation value of the lower-speed-node; and
- a position-accuracy value of the lower-speed-node.

31. The lower-speed-node of claim 26, wherein the position notification message further comprises:
- a compass heading value of the lower-speed-node; and
- an angle-acceleration value of the lower-speed-node.

32. The lower-speed-node of claim 31, wherein the processor module sets the class-speed value to a two-wheeler and sets the angle-acceleration value considering a current position value of a steering wheel of the two-wheeler, expressed as a positive angle of longitudinal and lateral acceleration.

* * * * *